US 10,143,122 B2

(12) United States Patent
Smeets et al.

(10) Patent No.: US 10,143,122 B2
(45) Date of Patent: Dec. 4, 2018

(54) TOOL SYSTEM

(71) Applicant: Betek GmbH & Co. KG, Aichhalden (DE)

(72) Inventors: Florian Smeets, Dossenheim (DE); Ulrich Kraemer, Wolfach (DE); Fabian Seifried, Herrenzimmern (DE)

(73) Assignee: Betek GmbH & Co. KG, Aichhalden (DE)

( * ) Notice: Subject to any disclaimer, the term of this patent is extended or adjusted under 35 U.S.C. 154(b) by 0 days.

(21) Appl. No.: 15/212,424

(22) Filed: Jul. 18, 2016

(65) Prior Publication Data
US 2016/0353652 A1    Dec. 8, 2016

Related U.S. Application Data

(63) Continuation of application No. PCT/EP2015/081047, filed on Dec. 22, 2015.

(30) Foreign Application Priority Data

Dec. 22, 2014   (DE) .................. 10 2014 119 359

(51) Int. Cl.
*A01B 15/06* (2006.01)
*A01B 39/22* (2006.01)
(Continued)

(52) U.S. Cl.
CPC .............. *A01B 31/00* (2013.01); *A01B 15/06* (2013.01); *A01B 23/02* (2013.01); *A01B 39/22* (2013.01); *A01B 15/02* (2013.01); *A01B 35/22* (2013.01)

(58) Field of Classification Search
CPC ......... A01B 15/06; A01B 39/22; A01B 15/10; A01B 15/02; A01B 31/00
(Continued)

(56) References Cited

U.S. PATENT DOCUMENTS 530,452 A * 12/1894 Prentice ................. A01B 15/06
172/753
750,985 A * 2/1904 Lane ..................... A01B 15/06
172/724
(Continued)

FOREIGN PATENT DOCUMENTS

AT          008566 U1 * 10/2006
AT          11 730 U1    4/2011
(Continued)

OTHER PUBLICATIONS

International Search Report and Written Opinion (Application No. PCT/EP2015/081047) dated Apr. 19, 2016.
(Continued)

*Primary Examiner* — John Weiss
(74) *Attorney, Agent, or Firm* — Burr & Brown, PLLC

(57) ABSTRACT

The present invention relates to a tool system for an agricultural ground cultivating machine having a base part which communicates, by means of a releasable connection, with a carrier element, in particular with a tine of the agricultural ground cultivating machine, wherein the base part comprises a cutter and, adjoining the cutter, at least one hard material element, and wherein the carrier element comprises, in its end region pointing in the operating direction, laterally arranged wing shares which are fitted with hard metal plates. In this case, it is provided that the edge of the wing share which is fitted with hard metal plates runs up to a lateral surface of the carrier element. The present invention additionally relates to an associated wing coulter. The tool system has reduced wear and tear and consequently extended changing intervals.

15 Claims, 5 Drawing Sheets

(51) Int. Cl.
   *A01B 31/00* (2006.01)
   *A01B 23/02* (2006.01)
   *A01B 15/02* (2006.01)
   *A01B 35/22* (2006.01)

(58) Field of Classification Search
   USPC .................................................. 172/730–733
   See application file for complete search history.

(56) References Cited

U.S. PATENT DOCUMENTS

| | | | | | |
|---|---|---|---|---|---|
| 1,095,404 | A | * | 5/1914 | Koepke | A01B 15/06 |
| | | | | | 172/719 |
| 1,205,416 | A | * | 11/1916 | Trout | A01B 15/06 |
| | | | | | 172/719 |
| 1,298,837 | A | * | 4/1919 | Ware | A01B 15/06 |
| | | | | | 172/772 |
| 3,923,104 | A | * | 12/1975 | Tibbs | A01B 39/22 |
| | | | | | 172/19 |
| 5,730,228 | A | * | 3/1998 | Mansur | A01B 35/08 |
| | | | | | 172/720 |
| 8,857,531 | B2 | * | 10/2014 | Smeets | A01B 15/06 |
| | | | | | 172/772.5 |
| 2016/0014950 | A1 | | 1/2016 | Smeets | |
| 2016/0037715 | A1 | | 2/2016 | Friederichs et al. | |

FOREIGN PATENT DOCUMENTS

| | | | |
|---|---|---|---|
| DE | 10 2011 119 629 A1 | | 5/2013 |
| DE | 10 2013 102 420 A1 | | 9/2014 |
| DE | 102014115209 A1 | * | 10/2014 |
| DE | 10 2013 104 836 A1 | | 11/2014 |
| EP | 1 723 840 A1 | | 11/2006 |
| FR | 3012283 | * | 10/2013 |
| GB | 675877 | * | 7/1952 |
| WO | WO2015033318 | * | 9/2014 |

OTHER PUBLICATIONS

German Office Action (Application No. 10 2015 122 625.1) dated Feb. 28, 2018.
Canadian Office Action (Application No. 2,937,071) dated Feb. 12, 2018.

* cited by examiner

TOOL SYSTEM

CROSS REFERENCE TO RELATED APPLICATIONS

This application is a continuation of International Application No. PCT/EP2015/081047 filed Dec. 22, 2015, which designated the United States, and claims the benefit under 35 USC § 119(a)-(d) of German Application No. 10 2014 119 359.8 filed Dec. 22, 2014, the entireties of which are incorporated herein by reference.

FIELD OF THE INVENTION

The present invention relates to a tool system for an agricultural ground cultivating machine having a base part which communicates, by means of a releasable connection, with a carrier element, in particular, with a tine of the agricultural ground cultivating machine, wherein the base part comprises a cutter and, adjoining the cutter, at least one hard material element, and wherein the carrier element comprises, in its end region pointing in the operating direction, laterally arranged wing shares which are fitted with hard metal plates.

The present invention additionally relates to a wing share of such a tool system.

BACKGROUND OF THE INVENTION

DE 10 2013 102 420 A1 discloses a tool combination for an agricultural ground cultivating machine having a share tip and a guide element connected to the share tip. The share tip and the guide element are fastened to a carrier element of an agricultural machine by means of a screw connection. A base part of the share tip comprises a cutter and, adjoining the cutter, at least one hard metal element. A receiving means, which is covered by means of a cover portion in the tool travel direction, is also incorporated in the base part, located opposite the cutter. A plug-in shoulder of the guide element can be inserted into said receiving means and secured therein. The cover portion on the receiving means of the base part additionally protects the guide element and the screw fastening of the tool combination from abrasive wear produced by the ground material removed by the share tip.

The tool combination comprises wing shares which are arranged laterally on the carrier element. The edge regions of the wing shares which point in the tool travel direction are fitted with hard metal plates at least in portions.

A disadvantage of the tool combination is that the edge regions of the wing shares pointing in the tool travel direction are exposed to a relatively high amount of wear, especially in the regions close to the carrier. This applies, in particular, to the transition regions from the wing shares to the carrier element which are no longer fitted with hard metal plates.

SUMMARY OF THE INVENTION

It is the object of the present invention to provide a tool system having a share tip, which is arranged on a carrier element, having a base part as the basic body and wing shares, which are mounted laterally on the carrier element, with improved wear performance which is matched to the components of the tool system with respect to one another.

Furthermore, it is the object of the present invention to provide a corresponding wing share.

The object of the present invention relating to the tool system is achieved in that the edge of the wing share which is fitted with hard metal plates runs up to a lateral surface of the carrier element.

As a result of the measure, the edge of the wing share is formed continuously by hard metal plates preferably from its outer end up to its inner completion on the carrier element. As a result, the edge is also realized in a wear-resistant manner in the transition region from the wing share to the carrier element. Increased abrasive wear in the inner portion of the edge is able to be avoided in this way. As a result, the stability of the wing share is able to be adapted to that of the base part. When the stability of the wing share and of the base part is the same or similar, it is possible to replace them at the same intervals. Maintenance expenditure and the stoppage times of the agricultural ground cultivating machine are able to be reduced as a result.

The object of the present invention relating to the tool system is additionally achieved in that the at least one hard material element which adjoins the cutter covers the hard metal plates, arranged in the region close to the carrier, of the wing share transversely with respect to the operating direction at least in part. In the operating direction and consequently in the direction of flow of the soil sliding past, the edge of the wing share is shielded in said arrangement in the transition region to the carrier element by the hard material element located in front of it. In this case, the hard material element is realized such that it shields the edge at least up to the innermost hard metal plate. The edge of the wing share, in its region facing the carrier element which, where applicable, is no longer covered by the hard metal plates of the wing share, is thus arranged so as to be shielded by the hard material element from the excessive effect produced by the soil sliding past and consequently from high mechanical load. As a result, the wear is able to be reduced significantly in said otherwise severely loaded portion. The measure also makes it possible to adapt the service life of the wing share to the service life of the share tip and the further components of the tool system with the previously described advantages.

It can be provided in an advantageous manner that a setting angle of the wing share is adjustable in relation to the carrier element in steps or steplessly within a predetermined range and that the at least one hard material element adjoining the cutter covers the hard metal plates, arranged in the region close to the carrier, of the wing share transversely with respect to the operating direction at least in part in all the adjustable setting angles of the wing share. As a result of adjusting the setting angle of the wing shares arranged on both sides of the carrier element, the tool system is able to be adapted to the respective working conditions. By the hard metal plates adjoining the carrier element being covered at least in part by the respective hard material element in all adjustable setting angles, the amount of wear in the regions of the wing shares facing the carrier element is able to be kept small. This is advantageous, in particular, in the case of steep setting angles where the wing shares present a large operating surface.

The hard material element connects to the cutter, preferably also produced from hard material, of the base part of the share tip. The hard material element covering the edge of the respective wing share in the region close to the carrier in the operating direction can be ensured as a result of a distance between the edge of the wing share, which is fitted with hard metal plates, and a ground area of the ground to be cultivated being smaller compared to a distance between an end point, located in the direction of flow of the ground material, of the at least one hard material element and the ground area. The hard material element extends from the cutter up to its end point at a height, measured from the ground area, which is above the height of the edge of the respective wing share. The edge region close to the carrier is consequently shielded by the hard material element in relation to soil sliding past. This applies advantageously to all possible setting angles of the wing shares.

Shielding the wing share at least partially in its region facing the carrier element can be ensured as a result of the length of the at least one hard material element adjoining the cutter in the direction of flow of the ground material being adapted to a horizontal position of the wing share which is fitted with hard material plates. The adaptation, in this case, can be effected for different assembly heights of various wing shares which can be used on the tool system, or for possible setting angles of the wing shares.

The adaptation of the position of the shielding produced by the hard material element can be made possible as a result of the hard material element adjoining the cutter being realized in one piece or multiple pieces. A one-piece hard material element can be produced in a cost-efficient manner and connected to the base part. It can bridge the height difference, with reference to the ground area, between the upper completion of the cutter and the necessary end point, which is located above the height of the edge of the wing share, in a certain region. If a greater height difference has to be bridged by the hard material element on account of the arrangement of the cutter of the share tip and the edge of the wing share, it can be advantageous, in particular more cost-efficient, to string several hard material elements together until the necessary height of the end point in relation to the ground area is reached. A hard material element realized in multiple pieces can also be sensible if the base part of the share tip is slightly curved, in particularly concavely, in the region of the hard material element for better guiding of the soil which slides past. The hard material element can follow such a shaping with sufficient accuracy in the case of a design in two or multiple pieces produced from evenly produced segments which are aligned at an angle with respect to one another.

The production costs for the tool system can be further reduced as a result of the hard material element being connected integrally to a cutting element which forms the cutter. Joints, in this respect, between the cutter and the hard material element, which form points of attack for the soil which slips past and consequently are subject to increased wear, are avoided in an advantageous manner.

Corresponding to a further preferred development variant of the present invention, it can be provided that the distance from the hard metal plate, arranged in the region close to the carrier, of the wing share to a plane which includes a lateral surface, facing the wing share, of the carrier element, is smaller than the distance from the outer dimension boundary, which is transverse with respect to the operating direction, of the hard material element to the plane. The hard material element consequently protrudes transversely with respect to the direction of travel, and consequently to the operating direction, as far as the innermost hard metal plate of the wing share and covers it in part. The region between the innermost hard metal plate and the carrier element is shielded as a result by the hard material element. In this way, the wear on the wing share in its region close to the carrier can be significantly reduced, even if the hard metal plates are not moved right up to the carrier element.

The greatest wear on the wing shares is effected on their edges which point in the operating direction, which is why the edges are covered with the hard material plates. The operating surface, which presents the hard material plates to the soil slipping past, is ultimately provided by the projection thereof in the direction opposite to the operating direction. In order to shield the operating surface fully, even in the region close to the carrier, by the hard material element which is mounted upstream in the operating direction, it can be provided that the projection of the hard material element in the opposite direction to the operating direction into a plane which includes the edge comprises a greater length perpendicular to the operating direction than the extent of the hard material plates in the operating direction. This ensures that the edge of the wing share, in its region connecting to the carrier element, is protected over an identical vertical extent by the hard material element as adjacently by the hard metal plates which are arranged along the edge of the wing share.

The region of the wing share close to the carrier being shielded sufficiently by the hard material element mounted upstream in the operating direction can also be ensured in that the projection of the outer dimension boundary of the hard material element in the opposite direction to the operating direction into a plane which includes the edge comprises a greater length than the extent of the hard material plates into the operating direction.

Good penetration of the tool system into the soil can be achieved as a result of the cutter being realized in a stepped manner, wherein the central region of the cutter protrudes in relation to the outer region of the cutter. As a result of the stepped penetration, the tensile force which is required to pull the share tip with the wing shares through the soil is reduced. The energy consumption of the agricultural ground cultivating machine can be reduced as a result.

The wear on the edges of the wing shares can be reduced further as a result of joint edges which are realized between adjacent hard metal plates being aligned obliquely with respect to a surface which extends vertically with respect to the ground area and in the operating direction. The achievement of setting the hard metal plates at an angle is that the material flow of the removed soil runs obliquely with respect to the joints realized between the hard metal plates. This leads to reduced wear along the joint edges.

Corresponding to a possible realization variant of the present invention, it can be provided that two wing shares which are arranged opposite one another on the carrier element are connected together integrally. The wing shares can be connected to the carrier element in this manner, aligned with the hard material elements mounted thereon, in one operating step and in an optimum manner with respect to one another and to the base part of the share tip mounted upstream.

To fasten the wing shares to the carrier element, in a preferred manner the wing shares each comprise a fastening plate. The fastening plate, in this case, is aligned at an angle to a base plate of the wing share which carries the hard metal plates and is, for example, integrally connected to said base plate. Fastening receiving means to mount the wing share on the carrier element are provided on the fastening plate. When mounted, the fastening plate abuts flatly against a lateral surface of the carrier element and is connected to the carrier element by means of suitable fastening elements. In order to avoid increased wear on the fastening plate produced by the soil slipping past, it can be provided that the base part covers at least in part the fastening plate of the wing share and/or fastening elements of the wing share for fastening the fastening plate on the carrier element transversely with respect to the operating direction. As a result of this arrangement, the base part shields the front end face of the fastening plate as well as the lateral surface thereof remote from the carrier element from the material flow of the soil. The service life of the wing share can be significantly lengthened as a result. As a result of shielding the fastening elements, for example screws and nuts, by way of which the fastening plate is screw-connected onto the carrier element, the wear thereof can also be reduced. This can avoid the wing share becoming detached from the carrier element and getting lost as a result of wear on the fastening elements. Tool inserts or tool attachments are also preserved such that the fastening elements are able to be opened without any problem even after a long period of use.

The object of the present invention relating to the wing share is achieved in that the edge runs as far as into the region of the fastening plate and/or as far as into the region of a transition contour which is formed between the fastening plate and the base plate. The edge is formed by hard metal plates and as a result is realized in a wear-resistant manner. By the edge running as far as into the region of the fastening plate or at least of the transition contour, the portion of the wing share facing the carrier element is also protected from wear. The service life of the wing share can be extended as a result.

The setting angle of the wing share is able to be adjusted as a result of the fastening plate comprising mounting elements and/or mounting receiving means for fastening the wing share on a carrier element of an agricultural ground cultivating tool and as a result of the mounting elements and/or mounting receiving means being designed in such a manner that the wing share is connectable to the carrier element at different setting angles.

BRIEF DESCRIPTION OF THE DRAWINGS

The present invention is explained in more detail below by way of an exemplary embodiment shown in the drawings, in which.

DETAILED DESCRIPTION OF THE INVENTION

Figure 1:
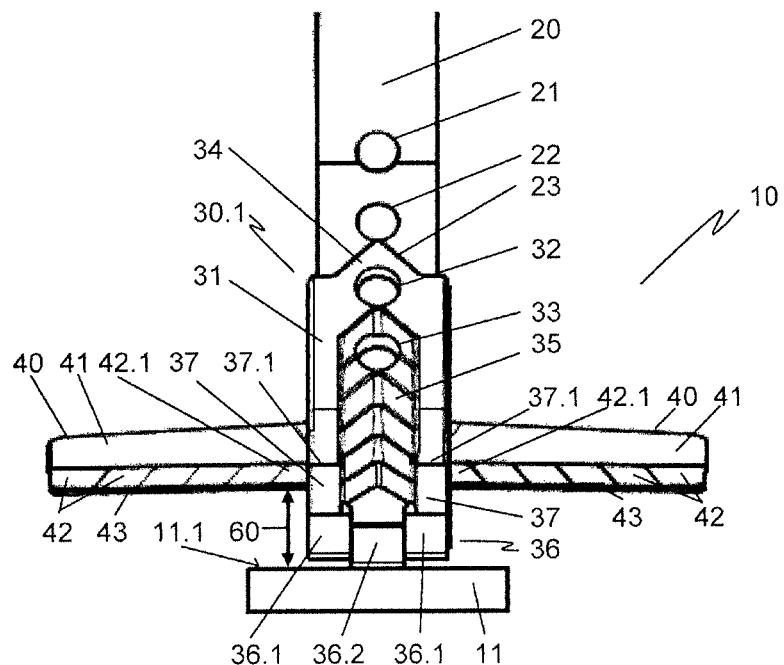
FIG. 1 shows a front view of the representation of a tool system with a base part, a guide element and two wing shares arranged laterally.

FIG. 1 shows a tool system 10 according to the present invention in a front view, with a base part 31, a guide element 20 and two wing shares 40 arranged laterally. The wing shares 40 are of mirror-symmetrical construction and will be described jointly below.

The base part 31 has, on its end pointing in an operating direction A, a cutter 36. The operating direction A is denoted in FIG. 2 by an arrow. The cutter 36 is formed from three cutting elements 36.1, 36.2 arranged adjacent to one another. Here, the two outer cutting elements 36.1 are set back in relation to the central cutting element 36.2. By way of this arrangement, a cutter 36 is formed which runs in stepped fashion. The cutting elements 36.1, 36.2 are formed from a hard material, preferably from hard metal. They have an areal fastening portion and, integrally formed thereon, a protrusion piece which projects counter to the operating direction. The cutting elements 36.1, 36.2 are thus in the form of angled hard material components. The cutting edge is formed in the region of the protrusion piece. The cutting elements 36.1, 36.2 are fastened to the base part 31 such that the free end edge of the base part 31 is at least partially engaged around by the protrusion pieces of the cutting elements 36.1, 36.2. In this way, the free end of the base part is protected against wear. The cutting elements 36.1, 36.2 are connected preferably cohesively, in particular by brazing, to the base part 31. Here, by way of the angled design of the cutting elements 36.1, 36.2, an additionally acting positively locking connection is provided.

Adjoining the outer cutting elements 36.1, and along the outer edges of the base part 31, there is arranged in each case one hard material element 37. In the present exemplary embodiment, the hard material elements 37 are each realized in one piece. It is, however, also conceivable for a hard material element 37 to be provided in multiple pieces. Opposite its attachment to the outer cutting element 36.1, the respective hard material element 37 terminates at an end point 37.1. The hard material elements 37 are connected to the base part 31 cohesively, in particular, by brazing.

In the central region thereof, the base part 31 has formed therein deflecting surfaces 35 which are of V-shaped form and which merge into one another in stepped fashion. Opposite the cutter 36, the base part 31 ends at a covering portion 34. The covering portion 34 is in the form of a V-shaped protrusion and covers that end of the guide element 20 which faces toward the base part 31. Recesses 32, 33 are also formed into the base part 31. The recesses serve for receiving fastening elements by way of which the base part 31 can be mounted on a carrier element 12 shown in FIG. 2.

The base part 31, the cutting elements 36.1, 36.2 and the hard material elements 37 together form a share tip 30.1.

The guide element 20 has two bores 21, 22. The bores 21, 22 serve for receiving assembly screws for the fastening of the guide element 20 to the carrier element 12 shown in FIG. 2. In addition, the guide element 20 is guided, by way of its end facing toward the share tip 30.1, under the covering portion 34 of the base part 31. In a manner which is not illustrated, the guide element 20 may, in its further profile averted from the base part 31, be designed to be twisted about its central longitudinal axis. In this way, the removed soil is deflected to the side.

Figure 2:
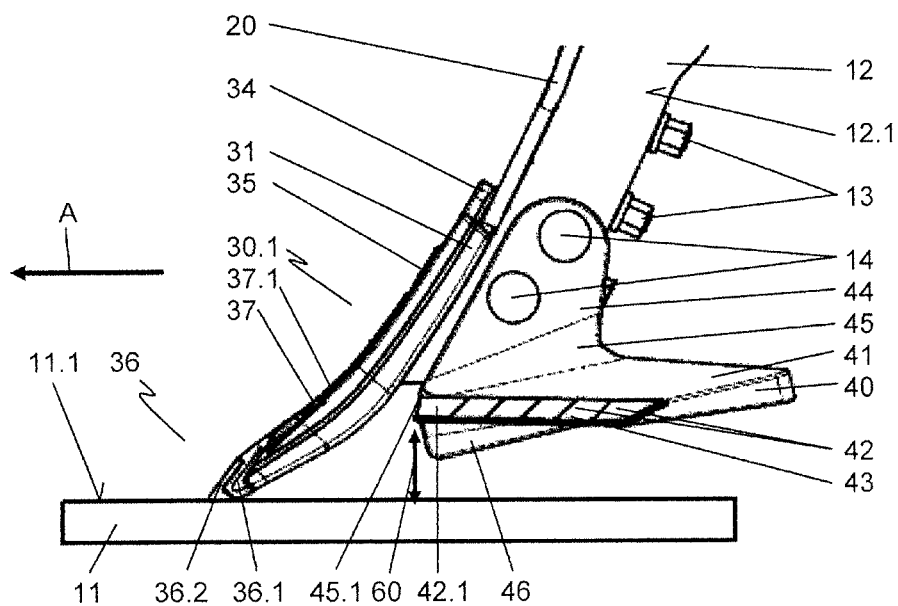
FIG. 2 shows a side view of the tool system according to FIG. 1.

The wing shares 40 are connected to the carrier element 12 shown in FIG. 2 in laterally projecting fashion and so as to follow the share tip 30.1 in the operating direction A. The wing shares each have a base plate 41. The base plates 41 are oriented at a setting angle in relation to a ground area 11.1 of ground 11 to be cultivated. Here, the setting angle is selected such that the distance between the ground area 11.1 and the base plate 41 increases with increasing distance from the share tip 40.1. At their front-end in the operating direction A, the base plates 41 are equipped with hard metal plates 42 with a hard metal plate 42.1 which is close to the carrier and faces toward the carrier element 12. The hard metal plates 42, 42.1 each form, by way of their front termination, an edge 43 of the wing shares 40. The edge 43 has a spacing 60 to the ground area 11.1. The abutting points of the hard metal plates 42, 42.1 that adjoin one another are arranged obliquely with respect to the working direction A.

The hard metal plates 42, 42.1 are connected preferably cohesively, in particular by brazing, to the base plate 41. In addition, the hard metal plates 42, 42.1 may have a positive-locking element by way of which additional coupling to the base plate 41 is realized.

During use, the tool system 10 is moved, by an agricultural ground cultivation machine that is not illustrated, along the operating direction A shown in FIG. 2. Here, the share tip 30.1 and the wing shares 40 engage into, and plough up, the ground 11 to be cultivated. The mechanically highly loaded regions of the cutter 36 of the share tip 30.1 and also of the edges 43 of the wing shares 40 are protected against excessive wear by the cutting elements 36.1, 36.2 produced from hard material and by the hard metal plates 42, 42.1. Those lateral edge regions of the base part 31 which follow the outer cutting elements 36.1 are protected by the hard material elements 37.

According to the present invention, the hard material elements 37 are arranged such that, in their projection directed oppositely to the operating direction A, as illustrated by the front view shown in FIG. 1, the hard material elements cover at least a part of the hard metal plates 42.1 close to the carrier. For this purpose, a spacing between the ground area 11.1 and the end point 37.1 of the respective hard material element 37 is selected to be greater than a spacing 60 between the edges 43 of the wing shares 40 and the ground area 11.1. Furthermore, the hard metal plates 42.1 close to the carrier are arranged with their inner termination so close to the carrier element 12 such that the projection of the hard material elements 37 at least partially covers the respective hard metal plates 42.1 close to the carrier. The projection of the hard material elements 37 in a vertical direction is preferably longer than the projection of the hard metal plates 42, 42.1 in the same direction. Here, the spacing of the end point 37.1 to the ground area 11.1 is advantageously equal to or greater than the spacing of that end of the hard metal plates 42, 42.1 which is situated opposite the edge 43 to the ground area 11.1. By way of the described arrangement, the transition region between the hard material plate 42.1 close to the carrier and the carrier element 12 shown in FIG. 2 is shielded by the hard material element 37 positioned respectively in front in the operating direction A. Removed soil is guided past the respective transition region by the hard material elements 37. In this way, the wear of the tool combination 10, in particular in those regions of the wing shares 40 which face toward the carrier element 12, can be considerably reduced. For the wing shares 40, it is thus possible to realize a service life similar to that of the share tip 30.1.

FIG. 2 shows the tool system 10 as per FIG. 1 in a side view. The same designations as those introduced in FIG. 1 are maintained here.

The base part 31 of the share tip 30.1 and the guide element 20 are mounted along a stop surface, pointing in the operating direction A, of the carrier element 12. The guide element 20 is, for this purpose, fastened to the carrier element 12 by way of screws inserted into the bores 21, 22 (see FIG. 1) and associated fastening nuts 13. Correspondingly, the share tip 30.1 is also screwed to the carrier element 12. The guide element 20 and the base part 31 are arranged such that that end of the guide element 20 which faces toward the base part 31 is covered in the operating direction A by the covering portion 34 of the base part 31. The end of the guide element 20 is thus held in its position and protected against abrasive wear by soil sliding past.

The base plate 41 of the wing share 40 is connected, via a transition contour 45, to a fastening plate 44. The fastening plate 44 is oriented at an angle, preferably at right angles, with respect to the base plate 41. The fastening plate bears with its side facing toward the carrier element 12 against a side surface 12.1 of the carrier element 12. The fastening plate 44 has a cross section which narrows with increasing distance from the base plate 41 and is rounded at its end averted from the base plate 41. The contour of the fastening plate 44 is designed such that its end face pointing in the operating direction A runs with a small spacing to the base part 31. The fastening plate 44 is connected by way of fastening elements 14, preferably screws, to the carrier element 12. On that side of the base plate 41 which faces toward the carrier element 12, and opposite the fastening plate 44, a guide portion 46 is connected to the base plate 41. The guide portion 46 serves for the lateral guidance of the tool system 10 during agricultural use.

The transition contour 45 between the base plate 41 and the fastening plate 44 is of filleted form. Here, in the exemplary embodiment shown, the radius of the fillet that is formed increases, proceeding from its region facing toward the hard metal plates 42, 42.1, toward the rear end of the base plate 41 and of the fastening plate 44. Into the transition contour 45, at its end pointing in the operating direction A, there is formed a plate receptacle 45.1, as is shown in more detail in FIGS. 5 to 9. The hard metal plate 42.1 close to the carrier is inserted, at least in sections, into said plate receptacle 45.1. The cohesive connection between the hard metal plate 42.1 close to the carrier and the base plate 41 and also the plate receptacle 45.1 within the transition structure 45 is in this case realized preferably by brazing. By way of the arrangement, it is possible for the hard metal plate 42.1 close to the carrier to extend all the way up to the side surface 12.1 of the carrier element 12. In this way, increased wear in that region of the wing share 40 which is close to the carrier can be avoided.

The wing share 40 is oriented at a predefined setting angle with respect to the ground area 11.1.

For the assembly of the tool system 10, the guide element 20 is screwed to the carrier element 12. The share tip 30.1 is subsequently mounted on the carrier element 12. In this case, the share tip 30.1 is oriented such that, by way of its covering portion 34, it covers, in the operating direction A, that end of the guide element 20 which faces the share tip. Subsequently, the wing shares 40, which are of mirror-symmetrical construction, are positioned in each case to the right and to the left of the carrier element 12 and are jointly fastened to said carrier element by way of fastening elements 14 which extend all the way through.

As can be seen from the side view, it is the case in the embodiment illustrated here that that end point 37.1 of the hard material element 37 which is arranged oppositely to the operating direction A and in the flow direction of the ground material is arranged in a horizontal plane above the edge 43 of the wing share 40. In this way, the edge 43 of the wing share 40 can, from the view of a horizontal projection onto the tool system 10, be protected against abrasion by ground material.

As can be seen from FIGS. 1 and 2, the base part 31 protrudes beyond the carrier element 12 transversely with respect to the operating direction A further than the fastening plates 44 of the mounted wing elements 40. In the direction of the longitudinal extent of the carrier element 12, the fastening plate 44 terminates approximately with the base part 31 of the share tip 30.1. The base part 31 thus at least substantially shields that end face of the fastening plate 44 which points in the operating direction A with respect to the material flow of removed soil. As can be seen in particular from FIG. 1, the base part 31 also covers, transversely with respect to the operating direction A, the fastening elements 14 by way of which the wing shares 40 are mounted on the carrier element 12. In this way, premature wear of the fastening plate 44 and of the fastening elements 14 can be prevented. Tool attachments or tool engagement portions of the fastening elements 14 are preserved even after long use of the tool system 10. A suitable tool can thus be attached without problems to a tool attachment or tool engagement portion, and the fastening element 14 released.

In the exemplary embodiment shown, the hard material elements 37 are realized in one piece. For example, if the spacing 60 between the ground area 11.1 and the edge 43 is selected to be greater than that indicated in the exemplary embodiment shown, it may be expedient for the hard material elements 37 to be realized in multiple pieces in order to bridge the regions between the outer cutting elements 36.1 and the position of the hard metal plates 42. By way of a hard material element 37 in multiple pieces, it is furthermore possible for a curved shape of the base part 31, as can be seen in FIG. 2, to be followed.

In a further embodiment of the present invention that is not illustrated, it may be provided that at least the outer cutting elements 36.1 and the associated hard material elements 37 are realized in one piece. In this way, the production costs can be reduced in relation to the manufacturing of individual parts.

Figure 3:
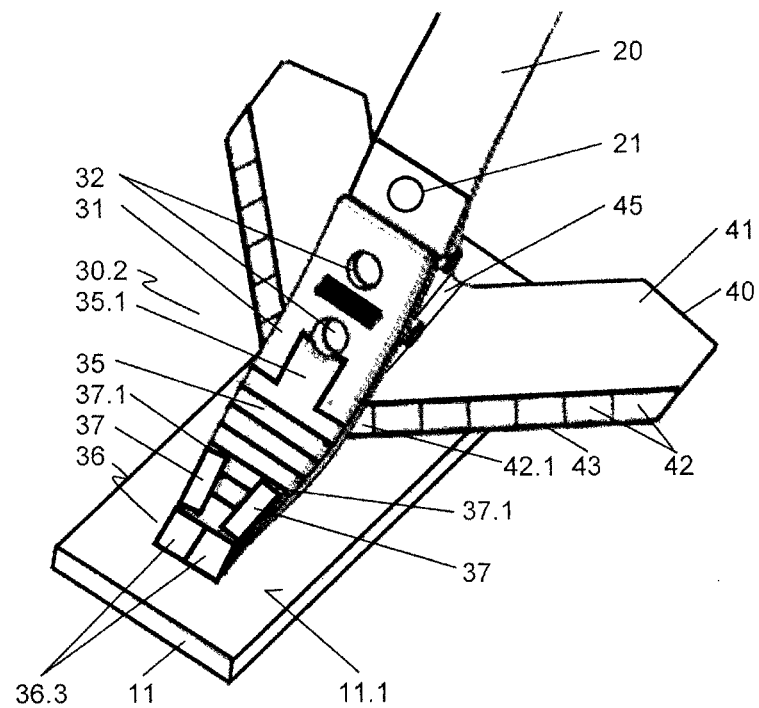
FIG. 3 shows a perspective representation of the representation of a further embodiment of a tool system.

FIG. 3 is an illustration of a further embodiment of a tool system 10 in a perspective illustration, having a second share tip 30.2. Components identical in function to those introduced in FIGS. 1 and 2 are provided with the same designations here.

The cutter 36 of the second share tip is formed by two mutually adjacent cutting elements 36.3. The cutter 36 is thus not of stepped form. The cutting elements 36.3 are joined by hard material elements 37. The hard material elements 37 may, as in the exemplary embodiment shown, be realized in one piece or else in multiple pieces. They may furthermore also be connected integrally to the associated cutting elements 36.3. Proceeding from their ends facing toward the cutting elements 36.3, the hard material elements 37 are, in their further profile, oriented outward slightly. Thus, the hard material elements 37, by way of their outer edges, follow the outer edges of the base part 31. The base part 31 has stepped deflecting surfaces 35 which run transversely with respect to the material flow. The deflecting surfaces transition into a protuberance 35.1. The protuberance 35.1 ends directly at that recess 32 of the base part 31 which is situated at the front in the operating direction A. Soil that slides past is thus guided past the recess 32, and past the fastening element arranged therein, by the protuberance 35.1. Furthermore, soil accumulates in the steps of the deflecting surfaces 35 and thus prevents or lessens direct contact between the soil sliding past and the base part 31. In this way, the wear of the base part can be reduced.

Toward the guide element 20, the base part 31 ends by way of a covering portion 34 which has a rectilinear termination. The guide element 20 is, by way of its end facing toward the base part 31, guided behind the covering portion 34 and held by the latter. Furthermore, the guide element 20 is connected to the carrier element 12 by way of fastening elements (not illustrated) which are inserted into the first bore 21. The covering portion 34 protects the end of the guide element 20 against increased wear.

It is also the case in the exemplary embodiment shown in FIG. 3 that the hard material elements 37 are arranged such that, in the projection directed oppositely to the operating direction A, the hard material elements cover at least a part of the hard metal plates 42.1 close to the carrier, and in this case in particular the edges 43 of said hard metal plates. The length of the hard material elements 37 is adapted to the discussed coverage of those edges 43 of the wing shares 40 which are close to the carrier. In this way, as described with regard to FIGS. 1 and 2, those regions of the wing shares 40 which are close to the carrier are shielded from the material flow of the soil sliding past. The service life of the wing shares 40 can thereby be lengthened considerably.

Figure 4:
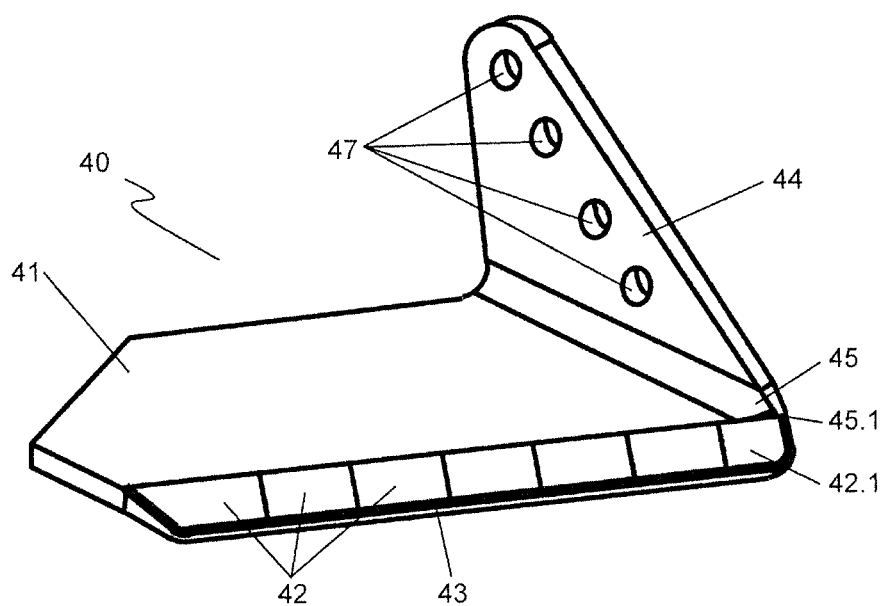
FIG. 4 shows a perspective representation of the representation of a wing share according to the present invention.

FIG. 4 is an illustration of a wing share 40 according to the present invention in a perspective view.

The edge 43 of the wing share 40 is formed by hard metal plates 42 arranged in a row. The base plate 41 is connected to the fastening plate 44 via a transition contour 45 of filleted form. The fastening plate 44 is oriented at an angle of preferably 90° with respect to the base plate 41. The fastening plate is extended through by four assembly receptacles 47. The assembly receptacles 47 serve for the fastening of the wing share 40, preferably by way of suitable screws, to the carrier element 12.

The hard metal plate 42.1 close to the carrier extends as far as into the region of the fastening plate 44. Thus, in the assembled state, the hard metal plate 42.1 close to the carrier directly adjoins the side surface 12.1 of the carrier element 12. The plate receptacle 45.1 into which the hard metal plate 42.1 close to the carrier is brazed is formed in the region of the transition contour 45.

By way of the arrangement shown, the front edge 43, formed by hard metal, of the wing share 40 extends into the transition region 45 and all the way up to the carrier element 12. In this way, the wear in the transition region 45 can be considerably improved in relation to a known arrangement in which the hard metal that is fitted ends with a spacing to the transition region 45. In the case of the assembled tool system 10 as described with regard to FIGS. 1 and 3, the region is advantageously additionally shielded by the hard material element 37 arranged in front in the operating direction A. The transition region from the base plate 41 to the fastening plate 44, which transition region is particularly sensitive with regard to wear, is thus protected to the greatest possible extent.

Figure 5:
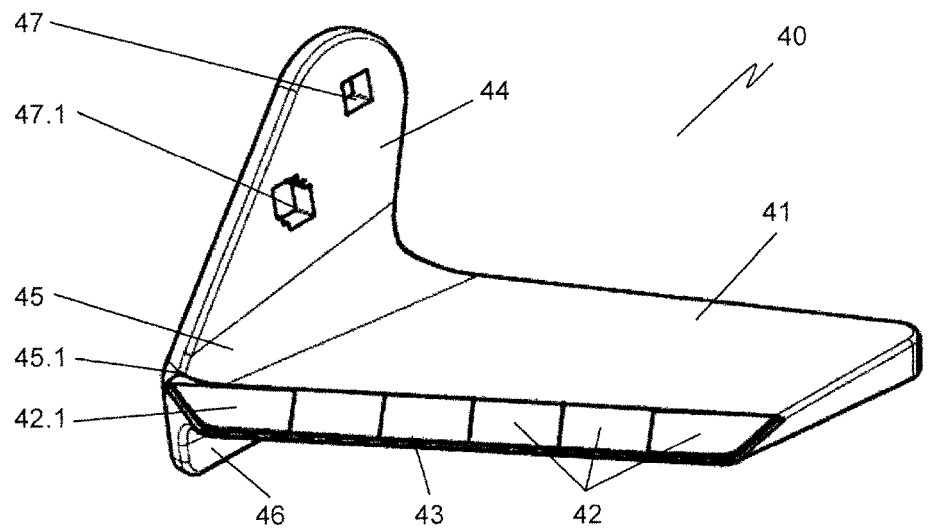
FIG. 5 shows a perspective representation of the representation of a further wing share according to the present invention with an adjustable setting angle.

FIG. 5 illustrates a further wing share 40 according to the present invention, with adjustable setting angle, in a perspective illustration. As already described with regard to FIG. 2, the wing share 40 illustrated here has a base plate 41, a fastening plate 44 connected thereto via a transition region 45 and arranged at an angle, and a guide section 46. The hard metal plate 42.1 close to the carrier is partially inserted into, and brazed in, a plate receptacle 45.1 formed in the region of the transition contour 45. The hard metal plate tapers to a point at its end facing toward the fastening plate 44. Thus, the hard metal plate covers the transition contour 45 as far as into the region of the fastening plate 44, and thereby has a wear-preventing action in said region.

The fastening plate 44 is extended through by an assembly receptacle 47 and by a multi-step assembly receptacle 47.1. The assembly receptacle 47 is in the form of a square aperture. A square shoulder of a carriage bolt (not shown)

can be fixed in the aperture. The carriage bolt serves for the fastening of the fastening plate 44 to the carrier element 12. The multi-step assembly receptacle 47.1 is, in the present exemplary embodiment, formed by three square apertures arranged in superposed fashion. The square shoulder of a carriage bolt provided for assembly purposes can thus be fixed in the multi-step assembly receptacle 47.1 in three different positions. In this way, the wing share 40 can, rotated about the assembly receptacle 47, be connected to the carrier element 12 in three setting angles.

By way of the multi-step assembly receptacle 47.1, the setting angle of the wing share 40 can be adapted to the respective working situation. By contrast to the design variant illustrated, it is also possible for multi-step assembly receptacles 47.1 to be provided which permit only two positions or more than three positions. Likewise, adjustment devices are conceivable which permit a continuous adjustment of the setting angle. The hard material element 37 shown in FIGS. 1 to 3 is advantageously dimensioned and arranged such that, in a projection directed oppositely to the operating direction A, the hard material element covers the edge 43, and at least a part of the hard metal plate 42.1 close to the carrier, in all of the possible setting angles.

Figure 6:
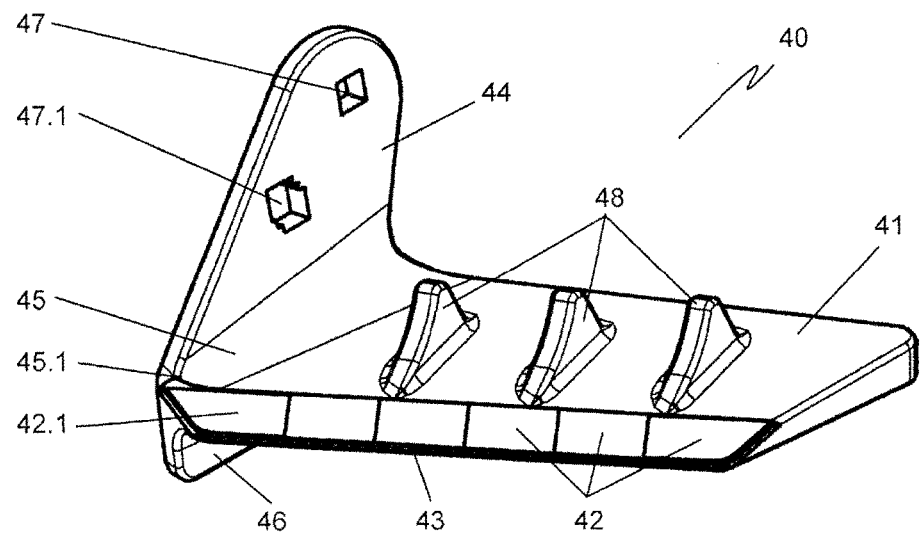
FIG. 6 shows a perspective view of the representation of a wing share with guide webs.

FIG. 6 is an illustration of a further wing share 40 with guide webs 48 in a perspective view.

Proceeding from a wing share 40 as illustrated in FIG. 5, it is the case in the design variant shown in FIG. 6 that three guide webs 48 are arranged on that side of the base plate 41 which is averted from the ground area 11.1 of the ground 11 to be cultivated. The plate-shaped guide webs 48 have an approximately triangular contour. The guide webs are arranged spaced apart on the top side of the base plate 41 and are fastened, preferably welded, thereto. The narrow sides of the guide webs 48 are oriented in the operating direction A.

The guide webs 48 effect lateral guidance, in addition to the guide section 46, of the tool system 10 during agricultural use.

Figure 7:
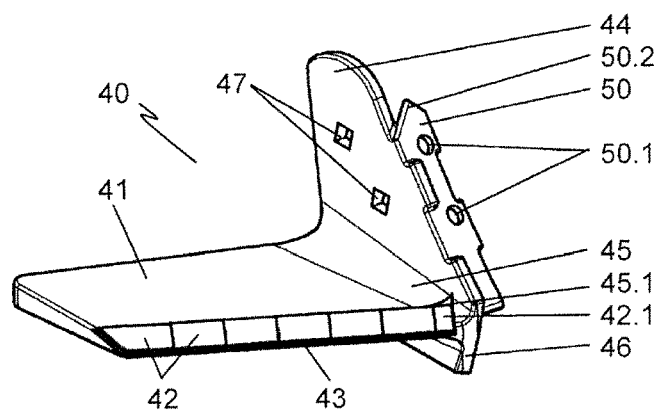
FIG. 7 shows a perspective view of the representation of a wing share with an inner stop plate.

FIG. 7 is an illustration of a wing share 40 with an inner stop plate 50 in a perspective view. Here, the exemplary embodiment shown is the wing share 40 situated on the right in the operating direction A.

The inner stop plate 50 is connected to the fastening plate 44 at an angle, preferably at right angles. The inner stop plate 50 may, for this purpose, be integrally formed on, or cohesively connected to, the fastening plate 44. The inner stop plate 50 is connected to that end face of the fastening plate 44 which faces toward the base part 31 of the share tip 30.1, 30.2 in the case of the assembled tool system 10. The inner stop plate is oriented toward that side of the fastening plate 44 which is averted from the base plate 41. Two inner fastening bores 50.1 are formed into the inner stop plate 50. In the upward direction in the assembled position, the inner stop plate 50 is terminated by an inner termination region 50.2 of triangular form.

Figure 8:
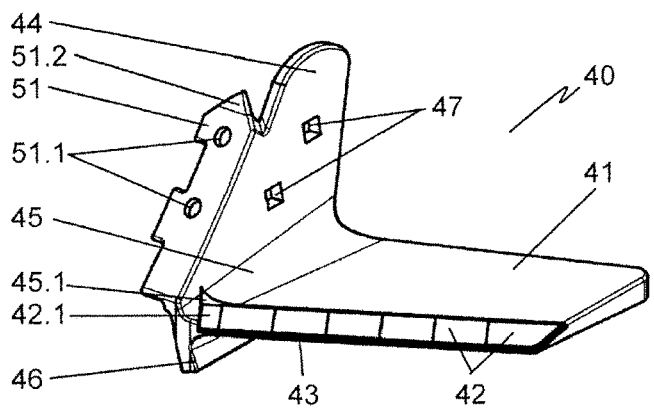
FIG. 8 shows a perspective view of the representation of a wing share with an outer stop plate.

FIG. 8 illustrates a wing share 40 with an outer stop plate 51 in a perspective view. Here, the wing share 40 is the wing share 40 situated on the left in the operating direction A.

The outer stop plate 51 is connected to the fastening plate 44 analogously to the inner stop plate 50 described with regard to FIG. 7. The outer stop plate also has two outer fastening bores 51.1 and an outer connecting region 51.2. The outer stop plate 51 is spaced apart slightly further than the inner stop plate 50 from the associated fastening plate 44.

Figure 9:
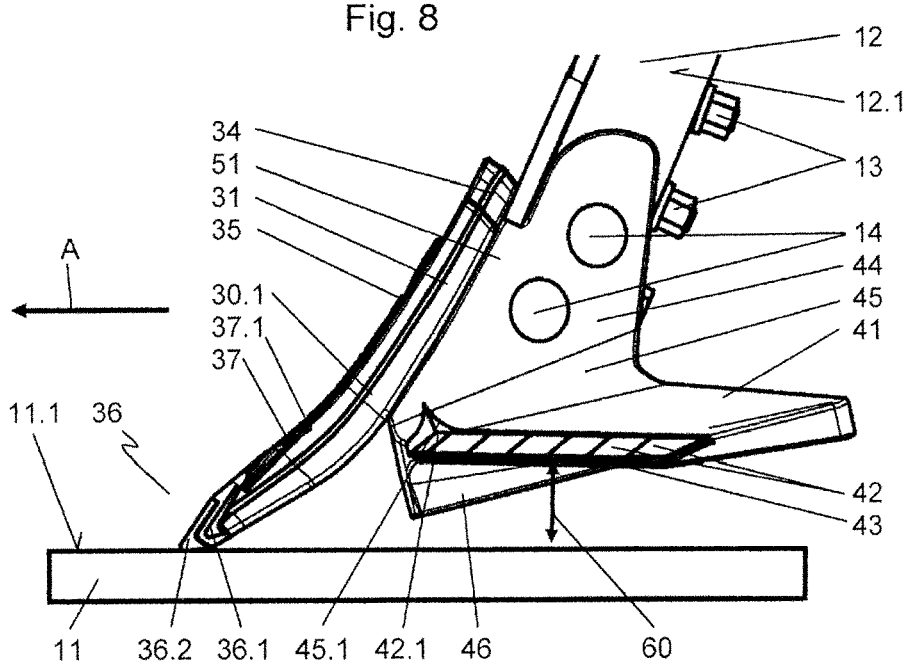
FIG. 9 shows a side view of the representation of a tool system with the wing shares shown in FIGS. 7 and 8.

FIG. 9 illustrates, in a side view, a tool system 10 having the wing shares 40 shown in FIGS. 7 and 8.

The wing shares 40 are arranged on the opposite side surfaces 12.1 of the carrier element 12 and are fastened to the latter by way of the fastening elements 14. Here, the inner and outer stop plates 50, 51 engage around the carrier element 12 in the working direction A. The inner and outer stop plates 50, 51 are situated one above the other in the assembled position. Here, the inner stop plate 50 faces toward the carrier element 12 and the outer stop plate 51 faces toward the base part 31 of the share tip 30.1.

Assembly screws arranged in concealed fashion are led through the recesses 32, 33, shown in FIG. 1, in the base part 31 and through the inner and outer fastening bores 50.1, 51.1 of the stop plates 50, 51. Thus, both the share tip 30.1 and the wing shares 40 are fastened to the carrier element 12 by way of the assembly screws.

The arrangement is selected such that the edges 43 of the wing shares 40 are covered, in their regions close to the carrier and in the operating direction A, by the hard material elements. Furthermore, the stop plates 50, 51 are covered, and thus protected against wear, by the base part 31.

The stop plates 50, 51 permit precise mutual positioning of the wing shares 40 relative to one another and relative to the carrier element 12 and the share tip 30.1. By way of the additional means of fastening to the carrier element 12, loss of the wing shares 40 can be reliably prevented.

Figure 10:
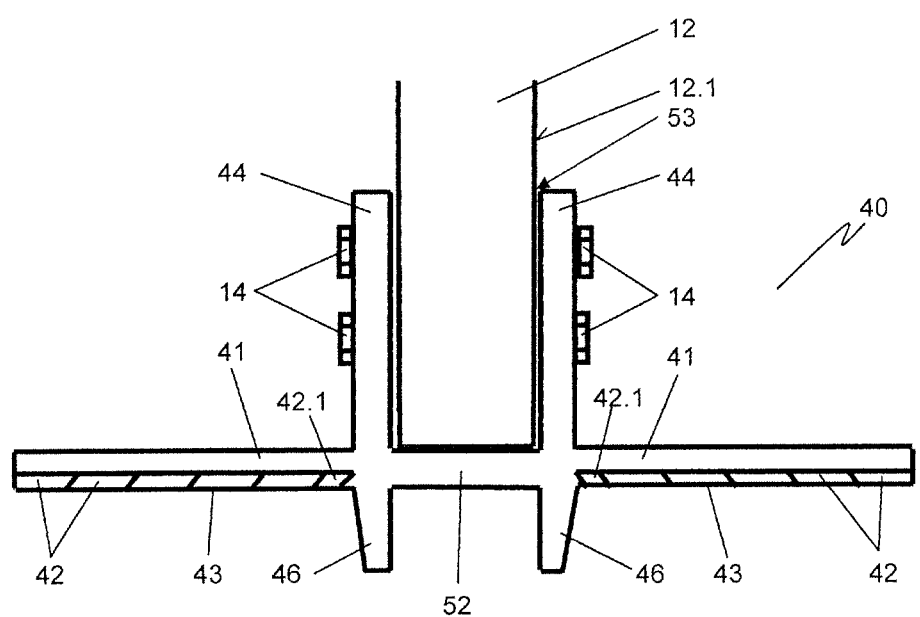
FIG. 10 shows a view from the front of two wing shares which are connected together integrally.

FIG. 10 shows two wing shares 40, connected integrally to one another, in a view from the front.

The wing shares 40 are connected to one another by a connecting web 52 arranged as an elongation of the base plates 41. The connecting web 52, together with the oppositely arranged fastening plates 44, forms a pocket 53. The carrier element 12 is inserted into said pocket 53 as far as the connecting web 52, and, in said position, is connected to the wing shares 40 by way of the fastening elements 14.

In the case of this arrangement, too, the hard metal plates 42.1 close to the carrier extend into the region of the fastening plates 44. They are thus at least partially shielded with respect to the removed soil by a hard material element 37 arranged in front in the operating direction A.

By way of the connection of the wing shares 40, a mechanically highly loadable and torsion-resistant construction of the tool system 10 is realized.

The invention claimed is:

1. A tool system for an agricultural ground cultivating machine having a base part which communicates, by means of a releasable connection, with a carrier element of the agricultural ground cultivating machine, the base part comprises a cutter and, adjoining the cutter, at least one hard material element, and the carrier element comprises, in an end region thereof, pointing in the operating direction, laterally arranged wing shares which are fitted with hard metal plates,
   wherein the base part covers at least in part one of a fastening plate of the wing shares or fastening elements of the wing shares for fastening the fastening plate on the carrier element transversely with respect to the operating direction, and
   wherein edges of the wing shares fitted with hard metal plates run up to lateral surfaces of the carrier element.

2. The tool system as claimed in claim 1, wherein a setting angle of the wing shares is adjustable in relation to the carrier element within a predetermined range and in that the at least one hard material element adjoining the cutter covers the hard metal plates, arranged in the region close to the carrier, of the wing shares transversely with respect to the operating direction at least in part in all the adjustable setting angles of the wing shares.

3. The tool system as claimed in claim 1, wherein a distance between the edges of the wing shares, which is fitted with hard metal plates, and a ground area of the ground to be cultivated is smaller compared to a distance between an end point, located in the direction of flow of the ground material, of the at least one hard material element and the ground area.

4. The tool system as claimed in claim 1, wherein the length of the at least one hard material element adjoining the cutter in the direction of flow of the ground material is adapted to a horizontal position of the wing shares which are fitted with hard material plates.

5. The tool system as claimed in claim 4, wherein a projection of the at least one hard material element in the opposite direction to the operating direction into a plane which includes an edge comprising a greater length perpendicular to the operating direction than the extent of the hard material plates in said direction.

6. The tool system as claimed in claim 4, wherein a projection of an outer dimension boundary of the at least one hard material element in the opposite direction to the operating direction into a plane which includes an edge comprising a greater length than the extent of the hard material plates into said direction.

7. The tool system as claimed in claim 1, wherein the hard material element adjoining the cutter is realized in one piece or multiple pieces.

8. The tool system as claimed in claim 1, wherein the hard material element is connected integrally to a cutting element which forms the cutter.

9. The tool system as claimed in claim 1, wherein the distance from the hard metal plates, arranged in the region close to the carrier, of the wing shares to a plane which includes a lateral surface, facing the wing shares, of the carrier element, is smaller than the distance from an outer dimension boundary, which is transverse with respect to the operating direction, of the hard material element to the plane.

10. The tool system as claimed in claim 1, wherein the cutter is realized in a stepped manner, wherein the central region of the cutter protrudes in relation to the outer region of the cutter.

11. The tool system as claimed in claim 1, wherein joint edges which are realized between adjacent hard metal plates are aligned obliquely with respect to a surface which extends vertically with respect to the ground area and in the operating direction.

12. The tool system as claimed in claim 1, wherein two wing shares which are arranged opposite one another on the carrier element are integrally connected together.

13. A tool system for an agricultural ground cultivating machine having a base part, wherein the base part communicates, by means of a releasable connection, with a carrier element of the agricultural ground cultivating machine, the base part comprises a cutter and, adjoining the cutter, at least one hard material element, and the carrier element comprises, in an end region thereof, pointing in the operating direction, laterally arranged wing shares which are fitted with hard metal plates, wherein the base part covers at least in part one of a fastening plate of the wing shares or fastening elements of the wing shares for fastening the fastening plate on the carrier element transversely with respect to the operating direction, and wherein the at least one hard material element which adjoins the cutter covers the hard metal plates, arranged in the region close to the carrier, of the wing shares transversely with respect to the operating direction at least in part.

14. A wing share for a tool system of an agricultural ground cultivating tool having a base plate, the wing share comprising a fastening plate configured to be fixed at an angle to the base plate, the base plate comprising hard metal plates which form an edge, wherein an edge of the wing share runs as far as into one of a region of the fastening plate or into a region of a transition contour which is formed between the fastening plate and the base plate, and wherein the base part covers at least in part one of a fastening plate of the wing share or fastening elements of the wing share for fastening the fastening plate on a carrier element of an agricultural machine transversely with respect to the operating direction.

15. The wing share as claimed in claim 14, wherein the fastening plate comprises mounting elements and/or mounting receiving means for fastening the wing share on the carrier element and the mounting elements and/or mounting receiving means are designed in such a manner that the wing share is connectable to the carrier element at different setting angles.

* * * * *